United States Patent
Iyer et al.

(10) Patent No.: US 12,175,272 B2
(45) Date of Patent: Dec. 24, 2024

(54) MANAGING PERIPHERALS IN A CONTAINERIZED ENVIRONMENT

(71) Applicant: Dell Products L.P., Round Rock, TX (US)

(72) Inventors: Vivek Viswanathan Iyer, Austin, TX (US); Gokul Thiruchengode Vajravel, Bangalore (IN); Michael S. Gatson, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 469 days.

(21) Appl. No.: 17/391,912

(22) Filed: Aug. 2, 2021

(65) Prior Publication Data
US 2023/0035594 A1 Feb. 2, 2023

(51) Int. Cl.
*G06F 9/455* (2018.01)
*G06F 9/52* (2006.01)

(52) U.S. Cl.
CPC ........... *G06F 9/45558* (2013.01); *G06F 9/52* (2013.01); *G06F 2009/45562* (2013.01); *G06F 2009/4557* (2013.01); *G06F 2009/45587* (2013.01)

(58) Field of Classification Search
None
See application file for complete search history.

(56) References Cited

U.S. PATENT DOCUMENTS

| | | | | |
|---|---|---|---|---|
| 6,826,751 | B1* | 11/2004 | Cardelli | G06F 21/51 703/2 |
| 9,003,080 | B2* | 4/2015 | Bachrany | G06F 21/82 710/37 |
| 9,747,039 | B1* | 8/2017 | Coleman | G06F 9/4881 |
| 11,748,285 | B1* | 9/2023 | Haim | G06F 13/4282 710/305 |
| 2009/0119773 | A1* | 5/2009 | D'Amore | G06F 9/5011 718/103 |
| 2011/0069710 | A1* | 3/2011 | Naven | G06F 13/404 370/395.3 |
| 2016/0203090 | A1* | 7/2016 | Caballero | G06F 13/12 710/62 |
| 2018/0198824 | A1* | 7/2018 | Pulapaka | H04L 41/5025 |
| 2020/0174813 | A1* | 6/2020 | Jain | G06F 9/4868 |

* cited by examiner

*Primary Examiner* — Chat C Do
*Assistant Examiner* — William C Wood
(74) *Attorney, Agent, or Firm* — Kirton McConkie; Brian Tucker

(57) ABSTRACT

Peripherals can be managed in a containerized environment. A peripheral can be virtualized in multiple containers to allow applications hosted in the containers to access the peripheral. Local applications may also be allowed to access the peripheral. Such access may be enabled by virtualizing handles to the peripheral. The applications' access to the peripheral may be managed in accordance with policy to thereby ensure that one application's access does not negatively impact another application's access.

20 Claims, 9 Drawing Sheets

301

| App Name | Peripheral Info |
|---|---|
| MS Word | Smartcard<br>Flash Drive {RW, QoS 0.1 Mbps} |
| Zoom | Webcam<br>Bluetooth<br>GPU |
| Chrome | Smartcard<br>Printer<br>Flash Drive {read-only, QoS 0.5 Mbps} |
| ... | |

App Info

| Identifier | App Name | Container Type |
|---|---|---|
| 0x1000<br>(Container PID) | MS Word | Software |
| 0x2000<br>(VMCS_ID) | Zoom | Hardware |
| 0x3000<br>(App PID) | Chrome | None |

401

| App Name | Identifier | Peripheral Info | Trust Level | Container Type |
|---|---|---|---|---|
| MS Word | 0x1000<br>(Container PID) | Smartcard<br>Flash Drive {RW, QoS 0.1 Mbps} | Medium | Software |
| Zoom | 0x2000<br>(VMCS_ID) | Webcam<br>Bluetooth<br>GPU | High | Hardware |
| Chrome | 0x3000<br>(App PID) | Smartcard<br>Printer<br>Flash Drive {read-only, QoS 0.5 Mbps} | Low | None |
| | | ... | | |

*FIG. 4*

MANAGING PERIPHERALS IN A CONTAINERIZED ENVIRONMENT

CROSS-REFERENCE TO RELATED APPLICATIONS

N/A

BACKGROUND

Containerization in the computing context refers to a technique for packaging an application and its dependencies into a container to abstract/isolate the application from the underlying host operating system and environment. A number of containerization techniques exist. FIG. 1 represents a computing device 100 that has physical hardware 101, a hypervisor 102 and a host operating system 120. Application 121 is an example of an application that is not containerized in that it relies on binaries/libraries 120 to interface directly with host operating system 110.

Application 122 is an example of containerized applications that is hosted in a software container. As represented in FIG. 1, application 122 and its binaries/libraries 131 may be isolated within its own container 132 that is executed via a container engine 130 that runs on host operating system 110. A Docker container is a common example of a software container.

Application 123 is an example of a containerized application that is hosted in a hardware container. As represented in FIG. 1, with a hardware container, a uni/mini kernel 140 may be executed on hypervisor 102. A container engine 141 can then be run on uni/mini kernel 140 to containerize application 123 and its binaries/libraries 142 in its own container 143.

It is becoming more common for an enterprise to use containerization solutions to run applications on computing devices that its employees may use. A primary benefit of employing containerization solutions is that it enables the applications to be deployed and launched from a cloud-based management server or other centralized repository as opposed to being installed on the computing devices in a traditional manner. As a result, the employees can launch the applications on a variety of computing devices.

Although employing a containerized environment to run applications on a computing device provides various benefits, it also introduces a number of limitations. For example, if a containerized application needs access to a peripheral, the peripheral will need to be mapped to the container in which the application in hosted. However, doing so may prevent other applications that are not hosted in the same container from accessing the peripheral. As an example, if a printer is mapped to container 132, application 122 may be able to access the printer, but application 121 and/or application 123 may not.

BRIEF SUMMARY

The present invention extends to systems, methods and computer program products for managing peripherals in a containerized environment. A peripheral can be virtualized in multiple containers to allow applications hosted in the containers to access the peripheral. Local applications may also be allowed to access the peripheral. Such access may be enabled by virtualizing handles to the peripheral. The applications' access to the peripheral may be managed in accordance with policy to thereby ensure that one application's access does not negatively impact another application's access.

In some embodiments, the present invention is implemented as a method for managing peripherals in a containerized environment. It can be detected that a first application is attempting to access a peripheral. A first virtualized handle can be provided to the first application by which the first application accesses the peripheral. It can also be detected that a second application is attempting to access the peripheral. A second virtualized handle can be provided to the second application by which the second application accesses the peripheral.

In some embodiments, the present invention is implemented as a method for managing peripherals in a containerized environment. It can be determined that a first application hosted in a first container should have access to a peripheral. The peripheral can be virtualized in the first container. It can be determined that a second application hosted in a second container should have access to the peripheral. The peripheral can be virtualized in the second container.

In some embodiments, the present invention may be implemented as computer storage media storing computer executable instructions which when executed implement a method for managing peripherals in a containerized environment. The method may include: determining that a first application hosted in a first container should have access to a peripheral; providing a first virtualized handle by which the first application accesses the peripheral; determining that a second application hosted in a second container should have access to the peripheral; and providing a second virtualized handle by which the second application accesses the peripheral.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIG. 4 provides an example of various data structures that may be employed in one or more embodiments of the present invention;

DETAILED DESCRIPTION

In this specification and the claims, the term "containerized environment" will be used to reference a computing device on which applications may be run in containers, including hardware containers and software containers. A containerized environment may include a single type of container or multiple types of containers. The containerized environment could exist on an end user computing device or on a server computing device (e.g., when the containerized applications are accessed by the end user via a virtual desktop infrastructure).

Figure 1:
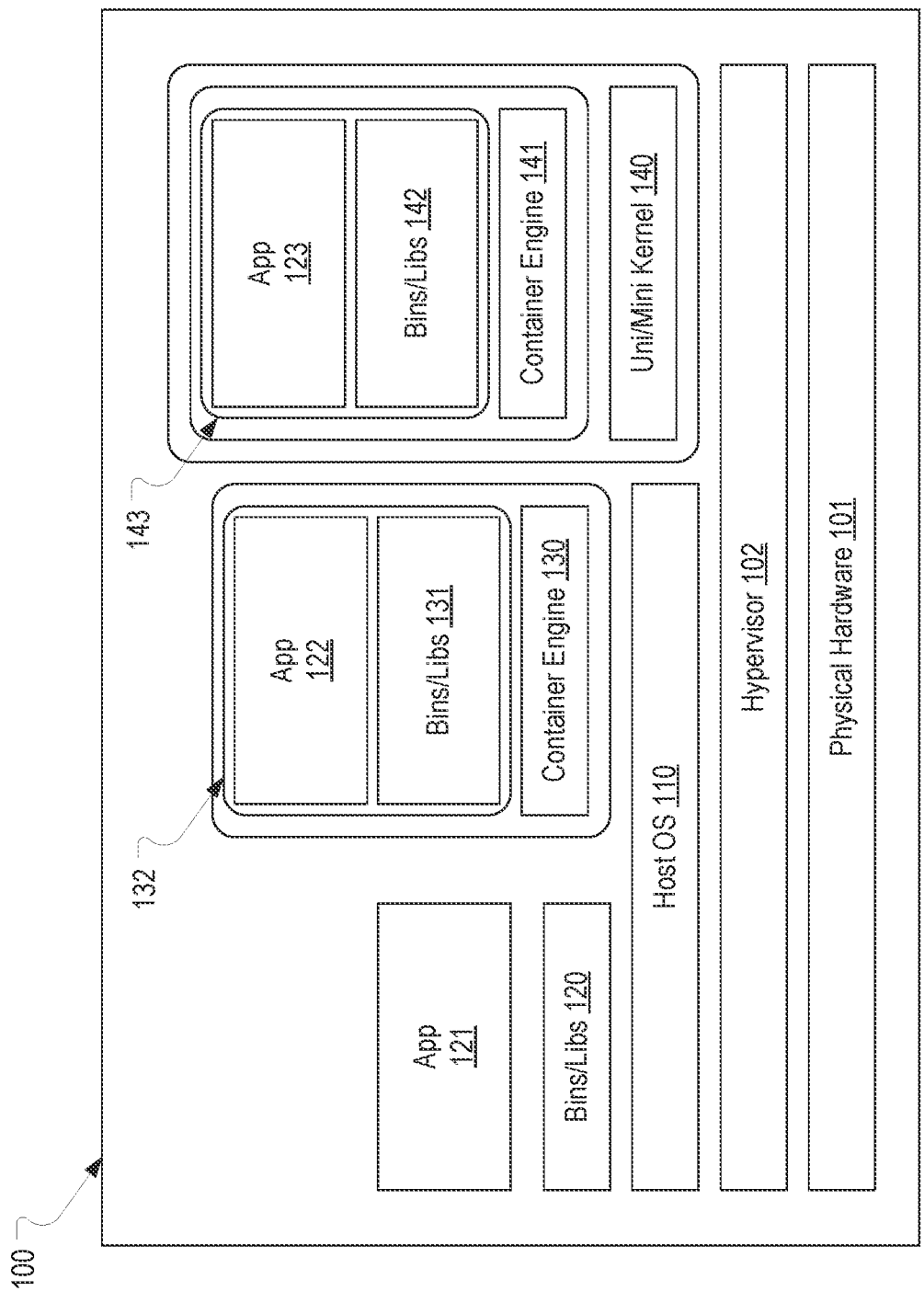
FIG. 1 provides an example of how containers may be implemented to host applications.
Figure 2:
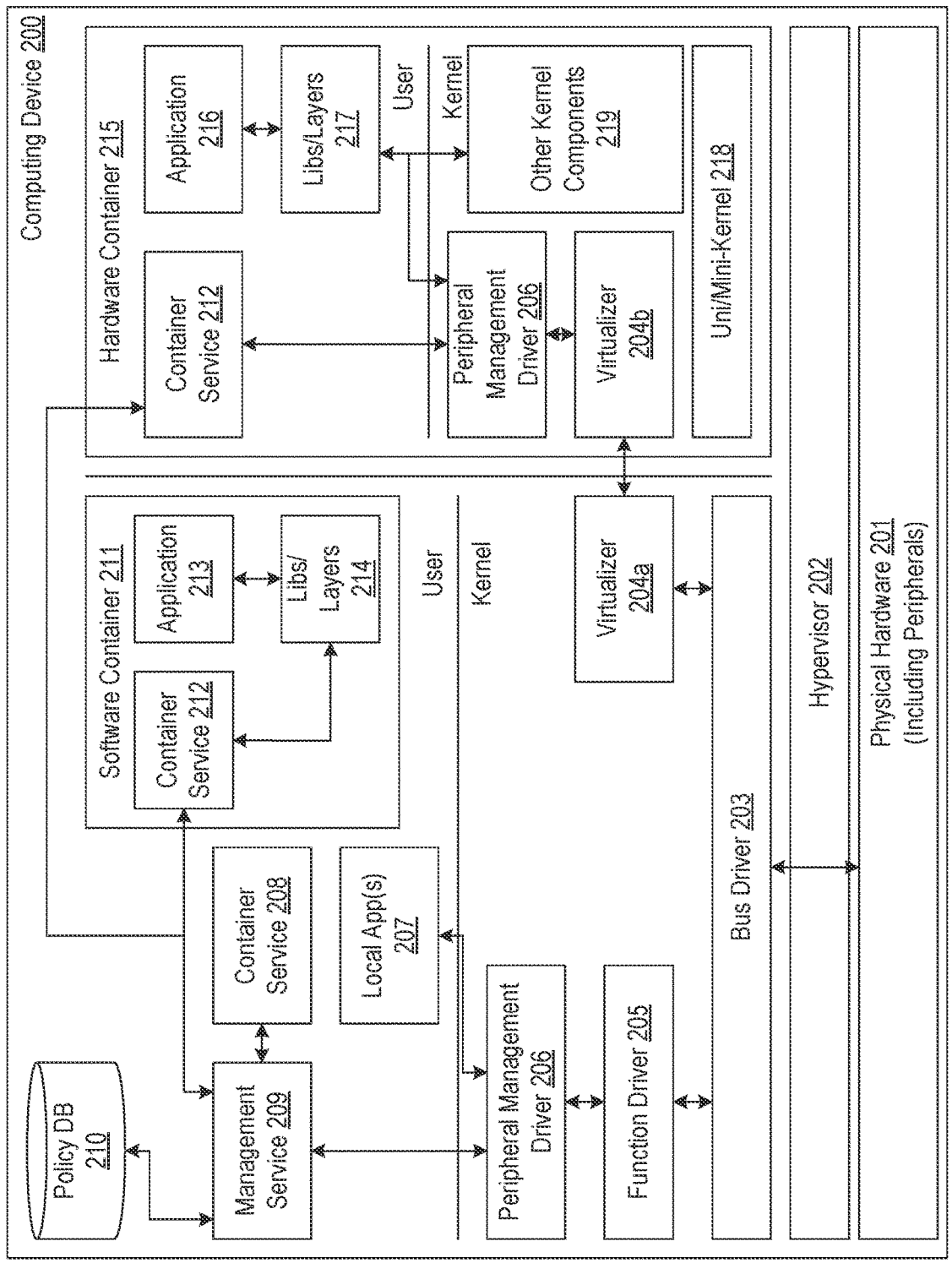
FIG. 2 provides an example of various components that may be employed on a computing device to manage peripherals in a containerized environment in accordance with one or more embodiments of the present invention.

FIG. 2 provides an example of various components that may be employed on a computing device 200 to manage peripherals in a containerized environment that exists on computing device 200. FIG. 2 is generally similar to FIG. 1 but includes a number of additional components for implementing embodiments of the present invention. As shown, computing device 200 can include physical hardware 201 that may include peripherals. These peripherals could be integrated into computing device 200 or connected to computing device 200 at any time. For example, the peripherals could include a webcam, a microphone, a USB storage drive, a printer, etc. In some embodiments, a hypervisor 202 may also exist on computing device 200 such as when hardware containers may be employed.

Various drivers may be loaded on computing device 200 to provide access to a peripheral. For example, a bus driver 203 may support access to peripherals connected to a common bus. Additionally, a peripheral-specific function driver 205 may be loaded above bus driver 203 thereby creating a device stack for the peripheral. Although a single function driver 205 is shown, there may be multiple function drivers 205 loaded on computing device 200 corresponding to the peripherals that are connected to computing device 200. As is known, user mode components can interface with function driver 205 to access the corresponding peripheral.

In scenarios where one or more hardware containers 215 may be created on computing device 200, a virtualizer 204a can be employed on the host operating system in conjunction with a virtualizer 204b in the hardware container 215 to virtualize a peripheral within hardware container 215. More particularly, virtualizers 204a and 204b can cause a virtual peripheral to be accessible within hardware container 215 and can route communications targeting the virtual peripheral to the actual peripheral. Virtualizers 204a and 204b can employ any suitable virtualization technique to accomplish this (e.g., USB redirection, driver mapping, etc.). Similar to what is shown in FIG. 1, hardware container 215 may include a uni/mini-kernel 218 and other kernel components 219.

In accordance with embodiments of the present invention, a peripheral management driver 206 can be loaded above any function driver 205 in the host operating system environment and above virtualizer 204b in any hardware container 215. For example, peripheral management driver 206 could be in the form of an upper filter driver that is loaded on the device stack of any peripheral that embodiments of the present invention may manage. Because peripheral management driver 206 is loaded above function driver 205 and virtualizer 204b (which may include a function driver for the virtualized device) respectively, it will receive any I/O requests issued by user-mode components that target the corresponding peripheral. These sources of I/O requests can include containerized applications (e.g., application 213 and application 216) and local applications 207.

A container service 208 may also be loaded on computing device 200 and may represent any components that manage containers on computing device 200. As one example only, container service 208 could represent the Docker daemon and its corresponding CLI and API. A management service 209 may be employed to interface with container service 208 for the purpose of detecting when a container is started or stopped on computing device 200. Management service 209 may also interface with the host operating system to detect when a peripheral is connected to (or enumerated on) computing device 200.

A policy database 210 may be maintained on computing device 200 for storing policies defining how access to peripherals in a containerized environment should be managed. Policy database 210 can represent any type of storage mechanism for maintain or providing access to such policies. In some embodiments, policy database 210 may exist on a server rather than on computing device 200. In any case, policy database 210 may preferably be managed centrally to thereby allow an administrator to define and distribute policies. These policies may be specific to computing device 200 or specific to a particular user or may be applicable to some other category or grouping of computing devices and/or users. As described in detail below, management service 209 may obtain applicable policies from policy database 210 as part of managing how a particular application may access peripherals.

When a software container 211 is created to host an application 213 that relies on libraries/layers 214, a container service 212 can be included within software container 211. Container service 212 can interface with libraries/layers 214 and management service 209 to enable application 213 to access a peripheral. Similarly, when a hardware container 215 is created to host an application 216 that relies on libraries/layers 217, container service 212 can be included within hardware container 215. When run in a hardware container, container service 212 can interface with peripheral access manager 206 and management service 209 to enable application 216 to access a peripheral.

Management service 209 can be configured to detect when a container is started (i.e., when a containerized application is launched on computing device 200) and, in response, can perform various functionality to enable the containerized application to access peripherals in accordance with applicable polices. Likewise, management service 209 can be configured to detect when a peripheral is connected to computing device 200 and can cause the peripheral to be accessible to a containerized application in accordance with applicable policies. U.S. patent application Ser. No. 17/165,036, which is incorporated by reference, describes examples of how management service 209 may be configured to perform such functionality.

In accordance with embodiments of the present invention, management service 209 can be configured to enable a peripheral to be accessed by applications that are hosted in different containers and by local applications. In other words, management service 209 can enable a peripheral to be accessed regardless of how an application may be hosted on a computing device. Additionally or alternatively, in some embodiments, management service 209 can be configured to manage peripherals in a containerized environment. For example, management service 209 can enable arbitration, prioritization, quality of service (QoS), etc. when containerized applications access a peripheral.

Figure 3A:
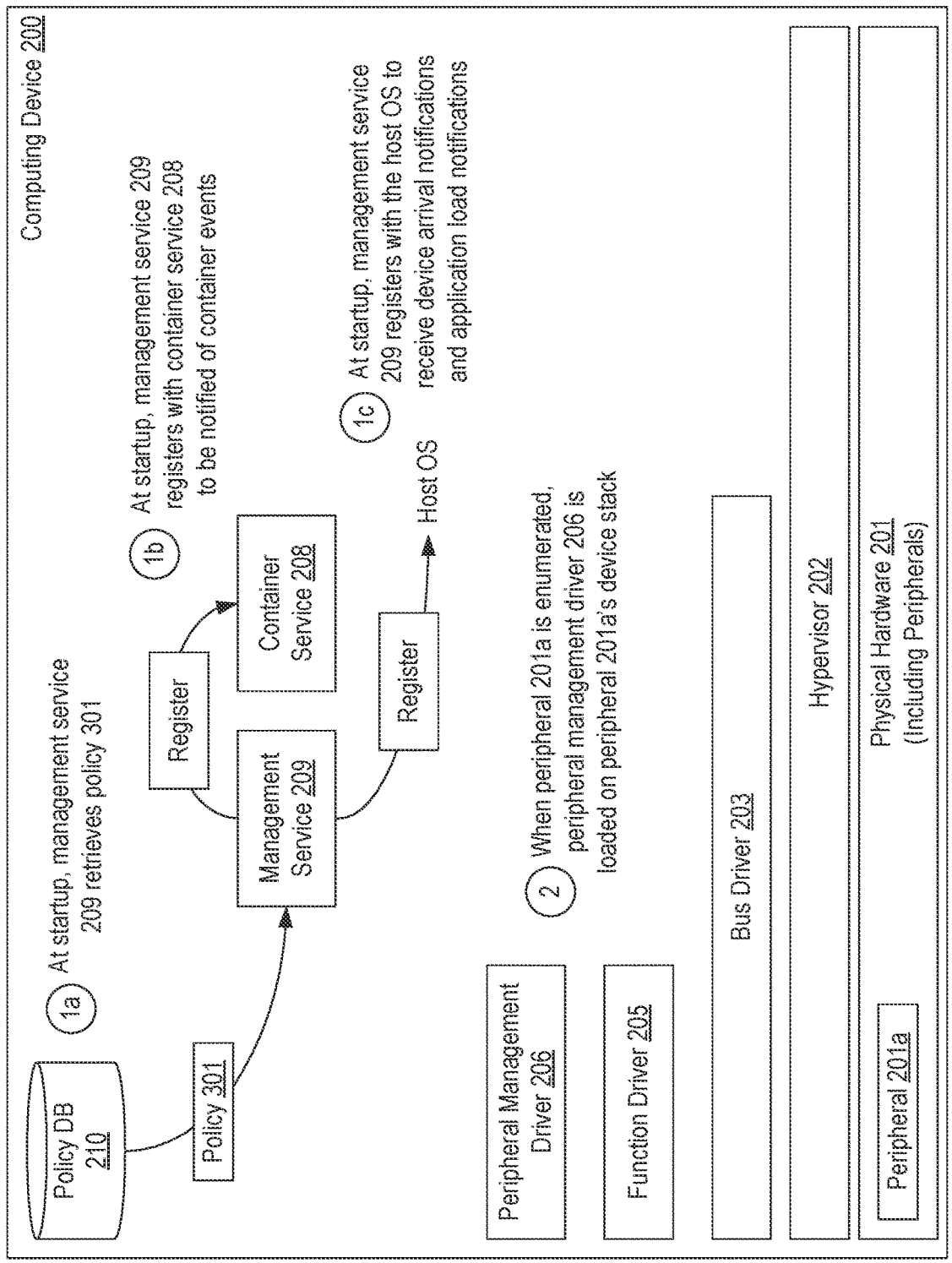
FIGS. 3A and 3B provide an example of how a management service can generate configurations to be used in managing peripherals in accordance with one or more embodiments of the present invention.
Figure 3B:
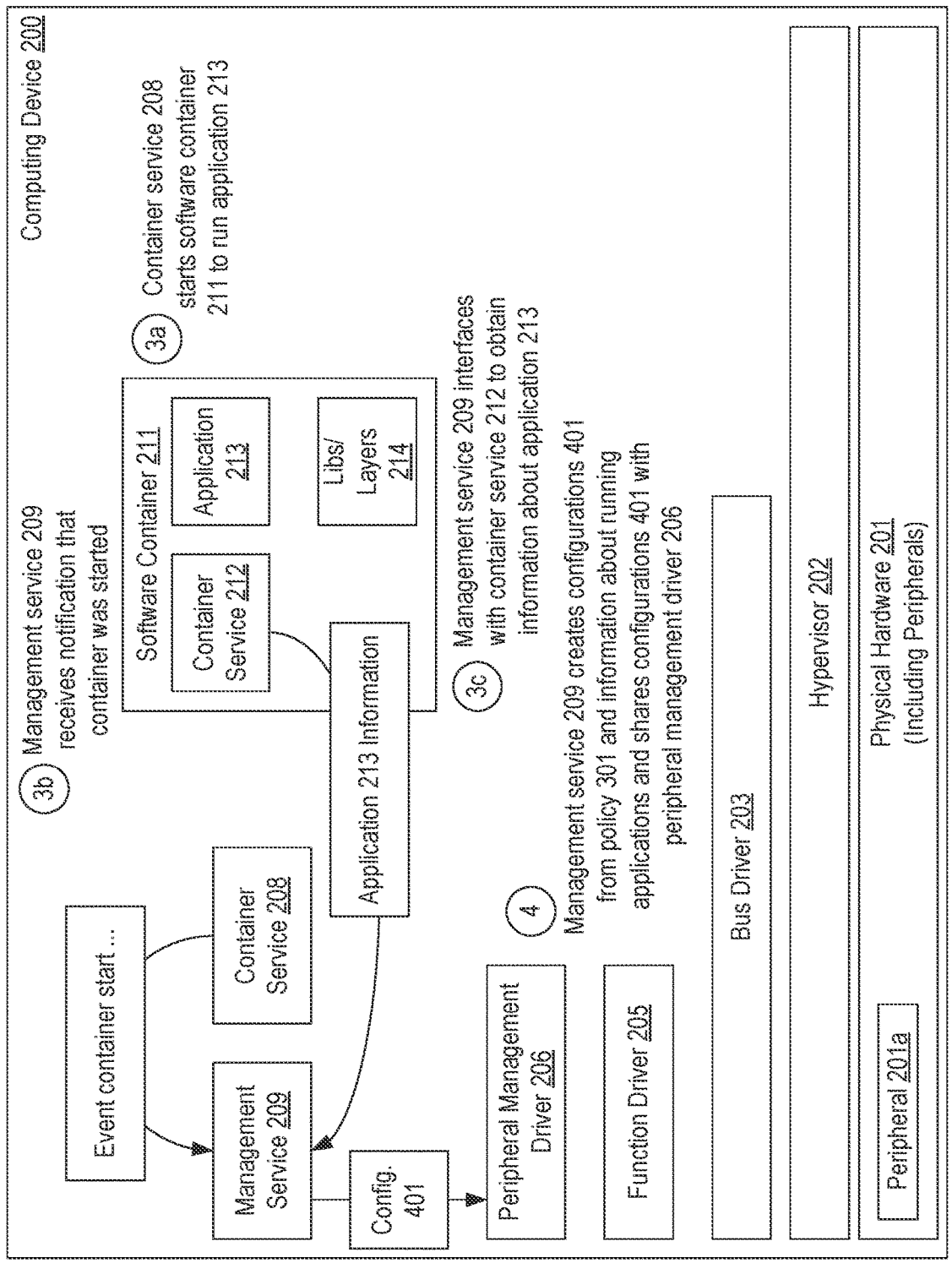

FIGS. 3A and 3B represent functionality that management service 209 may perform as part of initialization in one or more embodiments of the present invention. In FIG. 3A, it is assumed that management service 209 has just been loaded such as, for example, as part of booting computing device 200. At this point, it is assumed that no containers have been created on computing device 200. As part of management service 209's initialization, in step 1a, it can retrieve policy 301 such as from policy DB 210 and store it for subsequent use. In step 1b, management service 209 can register with container service 208 to receive notifications of container events. For example, if container service 208 represents the Docker daemon, management service 209 could employ the Docker CLI to listen for container start and stop events. In step 1c, management service 209 can also register with the host operating system to receive notifications when a peripheral is connected to (or enumerated on) computing device 200. For example, in a Windows-based implementation, management service 209 could call the RegisterDeviceNotificationW function or otherwise listen for device arrival notifications. In step 1c, management service 209 can also register to be notified when local (i.e., non-containerized) applications are loaded on computing device 200.

In step 2, it is assumed that a peripheral 201a, which may be integrated into computing device 200 or manually connected, is being enumerated. As a result of this enumeration process, function driver 205 is loaded to enable peripheral 201a to be accessed. Notably, although FIG. 3A represents a scenario where peripheral 201a is enumerated when no containers have been started (e.g., as part of the startup of computing device 200), the enumeration process would also be performed if peripheral 201a is connected when containers are running.

Turning to FIG. 3B, in step 3a, it is assumed that container service 208 starts software container 211 to run application 213. In step 3b, management service 209 receives notification that software container 211 has been started. Then, in step 3c, management service 209 interfaces with container service 212 to retrieve information about any application running in software container 211 (or "application information"), which in this example includes information about application 213 (e.g., its name). Although not shown, management service 209 could perform similar functionality when it is notified that a hardware container is created to thereby obtain application information for any application running in the hardware container. Additionally, when management service 209 is notified that a local application is loaded, it could interface with the operating system to obtain application information for the local application. In other words, management service 209 can compile application information for any application that may be running on computing device 200.

The application information that management service 209 obtains can include an application's name (e.g., MS Word) and an identifier that represents the application on computing device 200. For example, when the application is a local application, the identifier may be the application's process ID. When the application is hosted in a software container, the identifier may be the process ID of the container. When the application is hosted in a hardware container, the identifier may be the VMCS ID of the hardware container.

FIG. 4 provides an example of the type of information policy 301 may include in one or more embodiments of the present invention. As shown, policy 301 can include the name (or other identifier) of applications that the policy governs, peripheral information (e.g., which peripherals the applications should be allowed to access and any access controls/configurations), and a trust level for the applications. As stated above, in some embodiments, an administrator could define the content of policy 301. In other embodiments, a machine learning solution could generate the content of policy 301 based on information it obtains or knows about computing device 200's configuration, performance, state, etc.

In the depicted example, policy 301 identifies MS Word, Zoom and Chrome. It is assumed that MS Word is configured to be hosted in a software container, Zoom is configured to be hosted in a hardware container and Chrome is configured to run locally. Policy 301 dictates that MS Word should have access to smartcards and flash drives. Policy 301 also dictates that MS Word's access to flash drives should be read/write and that a quality of service of 0.1 Mbps should be provided. Policy 301 further assigns a medium trust level to MS Word. Similar configurations/settings are defined for Zoom and Chrome. Policy 301 is provided as an example only and any suitable information could be included within a policy.

Returning to FIG. 3B, upon receiving/obtaining application information for applications that have been loaded or are running on computing device 200, in step 4, management service 209 can create (or update) configurations 401 using policy 301 and the application information and share configurations 401 with peripheral management driver 206. Although not shown, management service 209 can share configurations 401 (or at least the relevant portions) with any instance of peripheral management driver 206 running in a hardware container. In some embodiments, management service 209 may share configurations 401 whenever an application is loaded and/or whenever policy 301 may be updated.

FIG. 4 also provides an example of how management service 209 may compile application information. As shown, the compiled application information may be in the form of a table that includes an entry for each application which defines the application's identifier on computing device 200 (e.g., the process ID of the application, the process ID of the application's software container or an ID of the application's hardware container). Each application's identifier may be associated with the application's name and container type. For example, assuming that MS Word is running in software container 211 (e.g., as application 213), management service 209 may associate software container 211's process ID with MS Word and define that MS Word is running in a software container.

FIG. 4 further provides an example of the type of information that configurations 401 may include (e.g., the type of information that management service 209 may share with peripheral management driver 206). As shown, management service 209 may use policy 301 and the application information it compiles to create configurations 401 which define an association between each application (e.g., the application's name and/or identifier) and the peripheral information for the application. For example, configurations 401 include an entry which associates software container 211's process ID (0×1000) with the peripheral information defined in policy 301 for MS Word. As described in greater detail below, management service 209 can share configurations 401 with peripheral management driver 206 to enable peripheral management driver 206 to manage/regulate the applications' access to the respective peripheral.

In conjunction with the above-described functionality, management service 209 can also determine which peripherals a containerized application should be able to access and can enable such access. In some embodiments, management service 209 could employ the techniques of U.S. patent application Ser. No. 17/165,036 for this purpose. Of primary relevance to embodiments of the present invention, management service 209 could enable a peripheral to be simultaneously accessed by multiple containerized applications and/or simultaneously accessed by one or more local applications and one or more containerized applications.

Figure 5A:
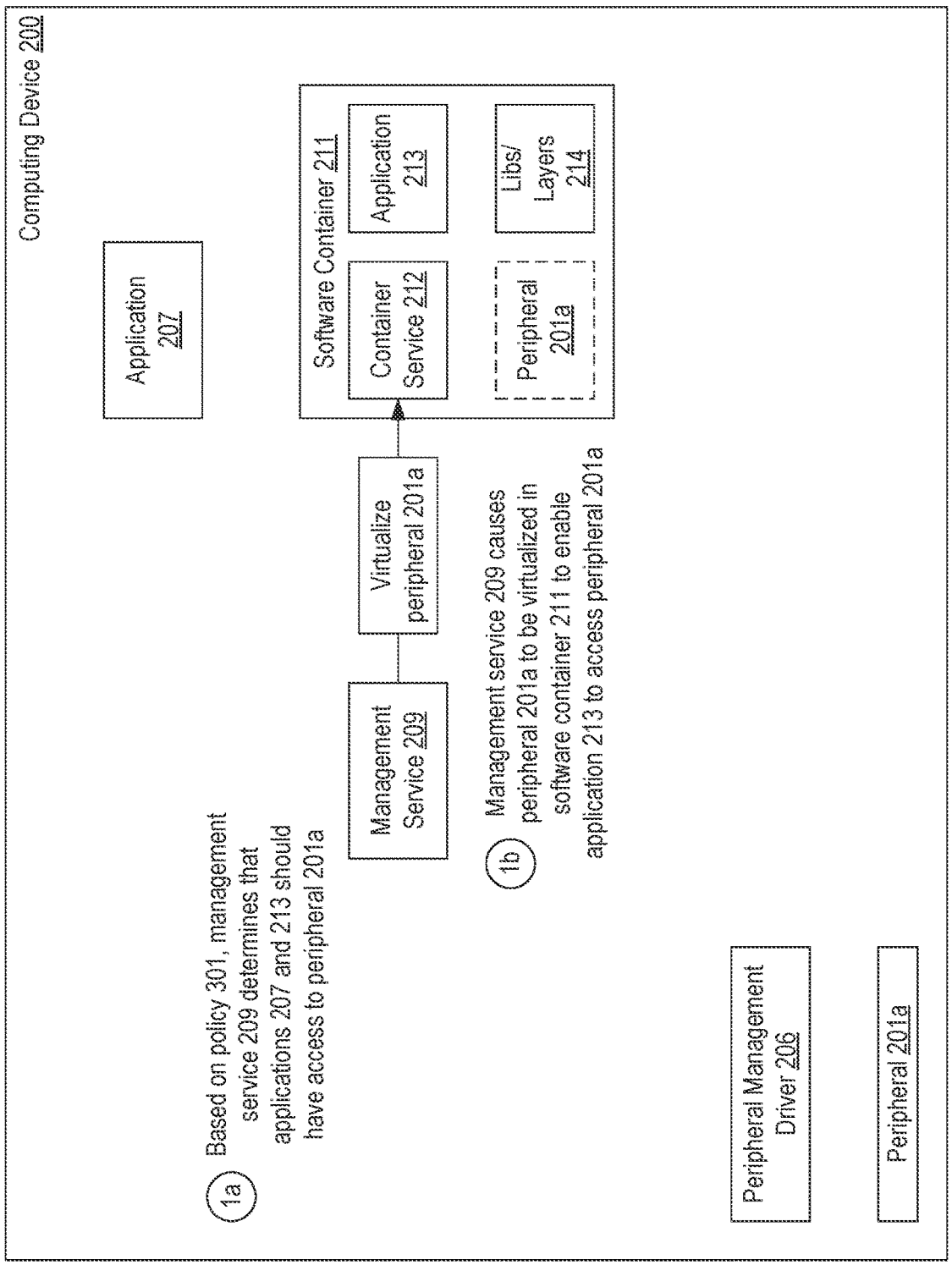
FIGS. 5A-5C provides an example of how multiple applications may be enabled to access a peripheral in a containerized environment in accordance with one or more embodiments of the present invention.
Figure 5B:
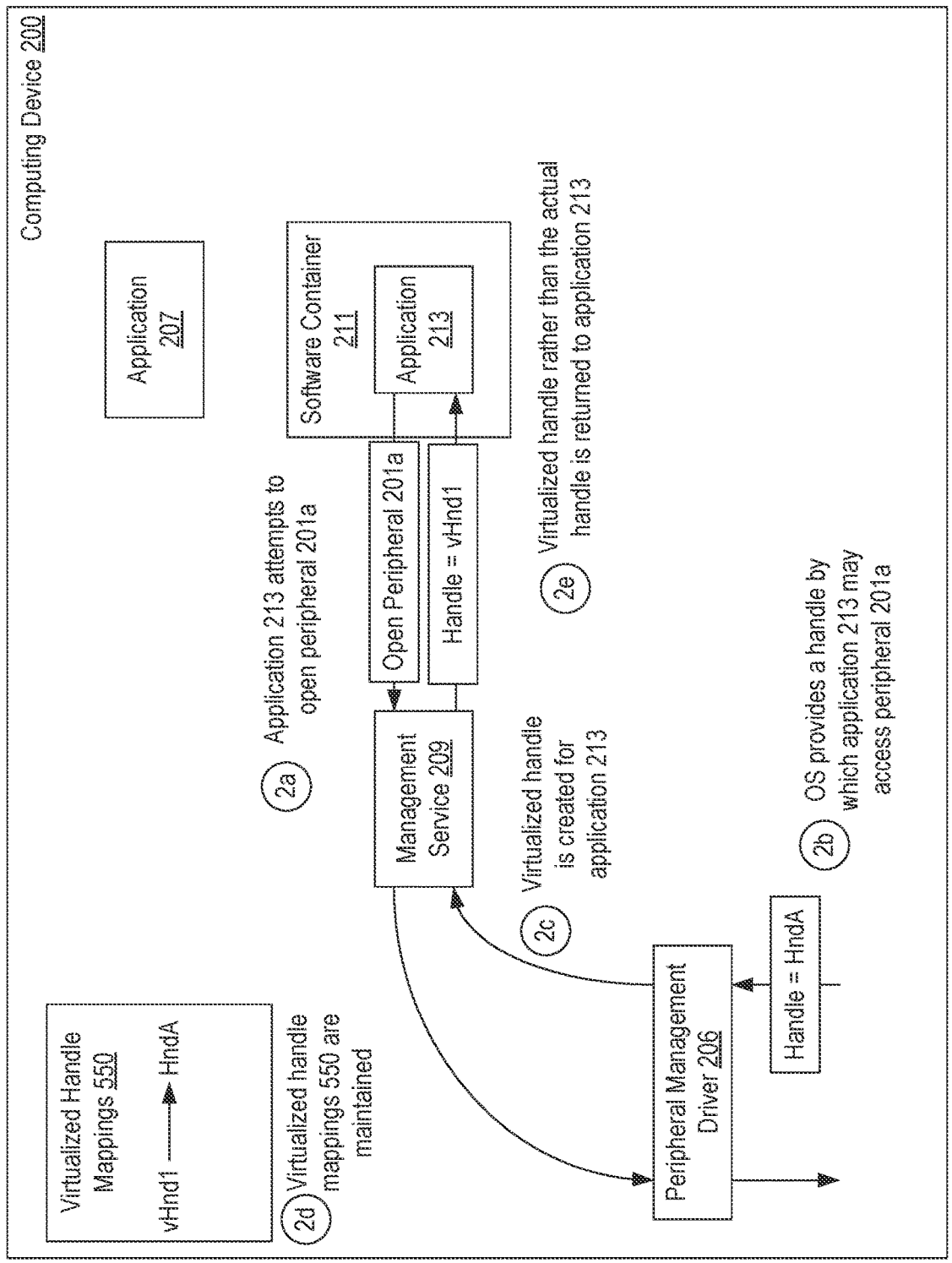
Figure 5C:
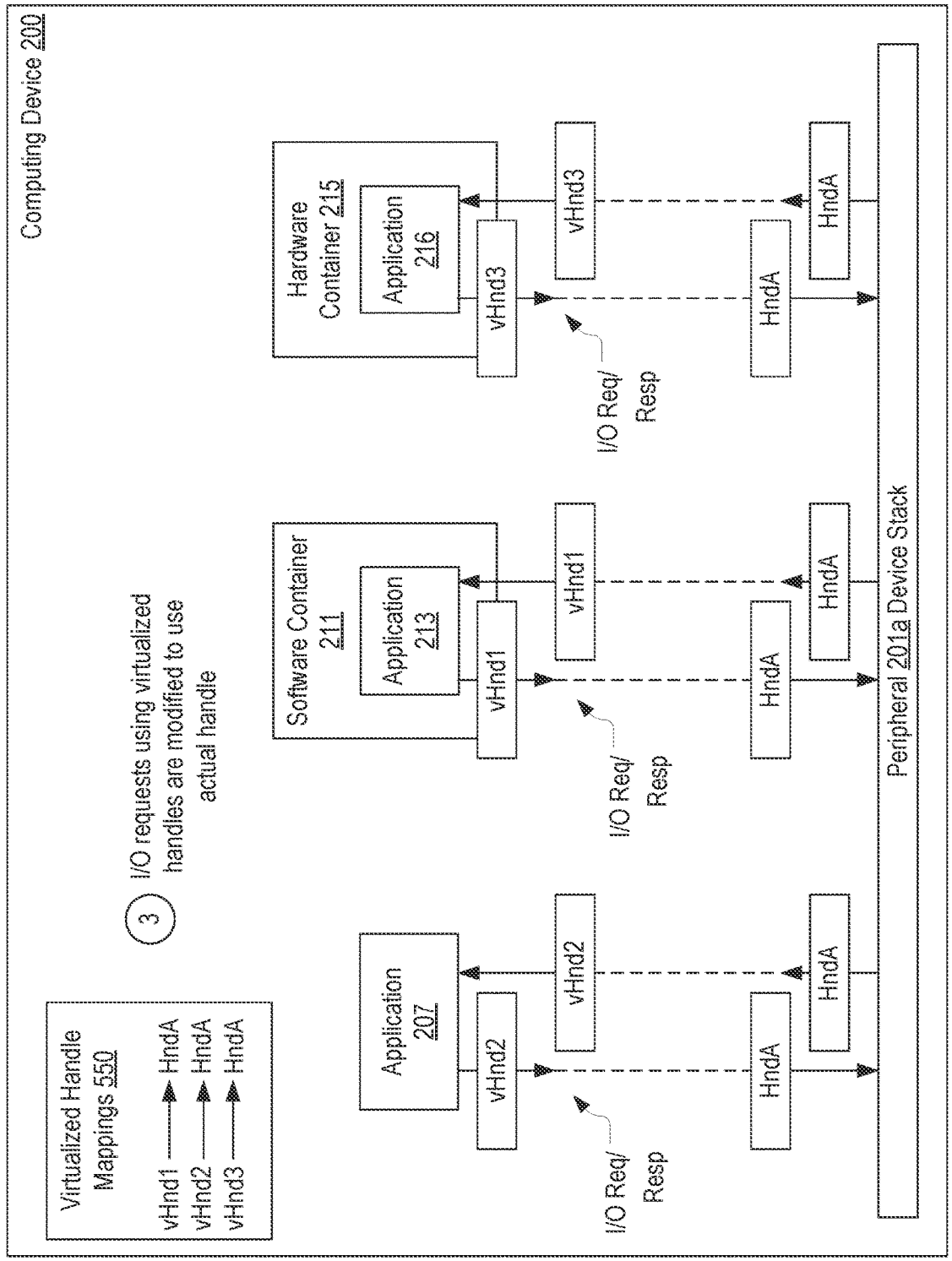

FIGS. 5A-5C provide an example of how management service 209 may enable multiple applications in a containerized environment to access a peripheral. Turning to FIG. 5A, it is assumed that peripheral 201a is connected to (or integrated into) computing device 200 and that applications 207 and 213 are running. The depicted functionality could be performed at any time such as in response to peripheral 201a being connected, in response to application 207 and/or application 213 being loaded or at any other suitable time.

In step 1a, based on policy, management service 209 can determine which applications should be allowed to access peripheral 201a, and particularly, which containerized applications should have access. In this example, it can be assumed that application 207 is Chrome, application 213 is MS Word, peripheral 201a is smart card or a flash drive and policy 301 is used. Accordingly, management service 209 can determine that both applications 207 and 213 should be allowed to access peripheral 201a. In step 1b, management service 209 can cause peripheral 201a to be accessible in accordance with policy 301 which may include interfacing with container service 212 to cause peripheral 201a to be virtualized in software container 211 (and in any other container in which an application that should have access is running). As described in U.S. patent application Ser. No. 17/165,036, management service 209 can interface with container service 212 in any software container to implement this virtualization. In any hardware container, virtualization may be accomplished via virtualizers 204a and 204b.

In some embodiments, such as when peripheral 201a is shareable (e.g., a printer), this virtualization of peripheral 201a in software container 211 (and any other container) can enable application 213 and application 207 (and any application in another container in which peripheral 201a is virtualized) to simultaneously access peripheral 201a. For example, as described in U.S. patent application Ser. No. 17/165,036, management service 209 can implement separate channels by which applications in software containers can access peripheral 201a while local applications retain their ability to access peripheral 201a in a typical manner and applications in hardware containers obtain access through virtualizers 204a and 204b.

In accordance with one or more embodiments of the present invention, management service 209 may be configured to virtualize handles to peripheral 201a. In some embodiments, virtualizing handles can enable multiple applications to simultaneously have exclusive access to peripheral 201a. For example, multiple containerized applications may simultaneously be granted exclusive access to a smart card.

FIG. 5B provides an example of how a virtualized handle may be created. In step 2a, application 213 attempts to open peripheral 201a. The resulting I/O request can be routed through peripheral management driver 206 to the underlying components in peripheral 201a's stack where, in step 2b, such components (i.e., the operating system) can assign a handle by which application 213 can access peripheral 201a. In step 2c, a virtualized handle can be created for application 213. In some embodiments, peripheral management driver 206 may create the virtualized handle, while in other embodiments, management service 209 may create the virtualized handle. In any case, in step 2d, virtualized handle mappings 550 can be created/updated to include a mapping between the actual handle (HndA) and the virtualized handle (vHnd1). Virtualized handle mappings 550 could be maintained by peripheral management driver 206 and/or management service 209. In step 2e, the virtualized handle rather than the actual handle can be returned to application 213 for use in sending I/O requests to peripheral 201a.

In some embodiments, peripheral management driver 206 may manage the virtualization of handles so that it may virtualize handles for containerized and local applications. In instances where a containerized application is running in a hardware container, the instance of peripheral management driver 206 running in the hardware container may manage the virtualization of handles for that application while the instance of peripheral management driver 206 running locally can handle virtualization of handles for applications running in software containers and possibly for local applications. Accordingly, different techniques could be employed to cause multiple applications running in software containers, hardware containers and/or locally to use virtualized handles. Therefore, although FIG. 5B only shows the virtualization of a handle for a single application running in a software container, it is to be understood that similar functionality can be performed to virtualize a handle for any application that attempts to open peripheral 201a.

Turning to FIG. 5C, it is now assumed that application 207 and application 216 have attempted to access peripheral 201a and, as a result, they have received virtualized handles (vHnd2 and vHnd3 respectively). Accordingly, each of applications 207, 213 and 216 have opened peripheral 201a. Notably, any one of applications 207, 213 and 216 could require exclusive access to peripheral 201a to function properly. Due to the virtualization of the actual handle, each of applications 207, 213 and 216 will perceive that it has exclusive access (e.g., because no other application/component has the same virtualized handle). Therefore, even though three applications are simultaneously accessing peripheral 201a, each application can function as if it had exclusive access.

To enable applications 207, 213 and 216 to access peripheral 201a with their virtualized handles, in step 3, peripheral management driver 206 (or possibly management service 209) can be configured to inspect I/O requests targeting peripheral 201a and replace the virtualized handle with the actual handle and to inspect responses to the I/O requests to replace the actual handle with the virtualized handle. Virtualized handle mappings 550 can be used for this purpose.

Figure 6:
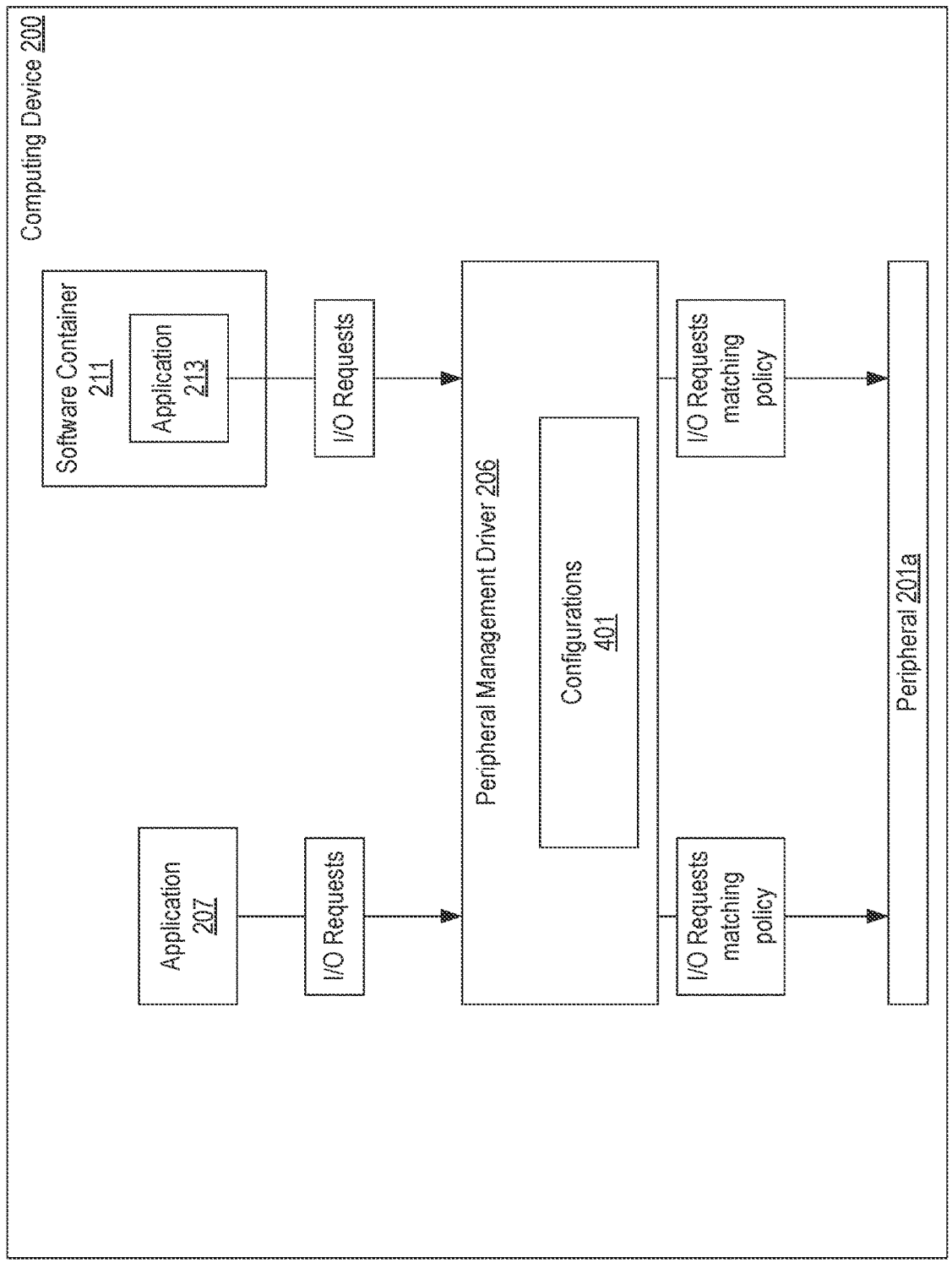
FIG. 6 provides an example of how I/O requests of applications can be managed in accordance with one or more embodiments of the present invention.

FIG. 6 provides an example of how peripheral management driver 206 can employ configurations 401 to ensure that peripheral 201a is accessed in accordance with policy 301. It is again assumed that application 207 is Chrome and application 213 is MS Word. It will also be assumed that peripheral 201a is a flash drive. Therefore, policy 301 dictates that application 207 should have read-only access to peripheral 201a with a QoS of 0.5 Mbps and that application 213 should have read/write access to peripheral 201a with a QoS of 0.1 Mpbs.

As shown, application 207 and application 213 can both be allowed to access peripheral 201a in accordance with embodiments of the present invention. In some embodiments, one or both of applications 207 and 203 could receive virtualized handles as described above. However, virtualization of handles need not be performed. In any case, as applications 207 and 213 submit I/O requests targeting peripheral 201a, peripheral management driver 206 can receive such I/O requests and analyze them against configurations 401. For example, peripheral management driver 206 could determine whether application 207 is attempting a write request and, if so, can block it. Similarly, peripheral management driver 206 could queue the I/O requests from applications 207 and 213 to ensure that their respective QoS (or that of any other application that may be accessing peripheral 201a) can be met. In cases where application 216 may also be accessing peripheral 201a, the instances of peripheral management driver 206 can communicate (e.g., via management service 209) to coordinate such efforts.

By managing I/O requests in accordance with policy, peripheral management driver 206 can ensure that an application running in one container does not compromise an application running in another container. For example, by applying the QoS defined in a policy, peripheral management driver 206 can ensure that an application running in a container does not exhaust a flash drive's resources to thereby prevent another application, including another containerized application, from accessing the flash drive.

In some embodiments, policy 301 may define a priority for applications. In such cases, management service 209 may employ the defined priorities to selectively virtualize or remove a peripheral from a container. For example, if a peripheral is virtualized to a first container to enable a first application to access it and then a second application with a higher priority is launched in a second container, management service 209 may remove the virtualized peripheral from the first container and virtualize it in the second container.

In some embodiments, the peripheral information in policy 301 could be created or updated, including dynamically at runtime, using a machine learning solution. For example, the machine learning solution could consider a trust level of containers and/or applications, a trust level of the computing device, location information, peripheral type, battery, etc. to predict the most efficient or effective configurations to be used.

In summary, embodiments of the present invention facilitate virtualizing a peripheral in multiple containers and/or allowing the peripheral to be accessible to multiple applications that are hosted in different manners. This access can be provided by virtualizing handles to the peripheral. The applications' I/O requests can be managed to ensure that policy is enforced.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for managing peripherals in a containerized environment, the method comprising:
  detecting that a first application is attempting to open a peripheral by detecting that an operating system has responded to an I/O request of the first application by providing a handle to the peripheral;
  preventing the first application from receiving the handle to the peripheral by providing a first virtualized handle rather than the handle to the first application;
  mapping the first virtualized handle to the handle;
  detecting that a second application is attempting to open the peripheral by detecting that the operating system has responded to an I/O request of the second application by providing the handle to the peripheral;
  preventing the second application from receiving the handle to the peripheral by providing a second virtualized handle rather than the handle to the second application;
  mapping the second virtualized handle to the handle;
  receiving an I/O request that includes the first virtualized handle or the second virtualized handle; and
  modifying the I/O request by replacing the first virtualized handle or the second virtualized handle with the handle.

2. The method of claim 1, wherein the first application is hosted in a first container and the second application is hosted in a second container.

3. The method of claim 2, wherein the first and second containers are software containers.

4. The method of claim 2, wherein the first and second containers are hardware containers.

5. The method of claim 2, wherein the first container is a software container and the second container is a hardware container.

6. The method of claim 1, wherein the first application is hosted in a container and the second application is a local application.

7. The method of claim 1, further comprising:
virtualizing the peripheral in one or more containers in which the first and second applications are hosted.

8. The method of claim 1, wherein a management service creates the first and second virtualized handles.

9. The method of claim 1, wherein a first instance of a peripheral management driver running in a first container creates the first virtualized handle and a second instance of the peripheral management driver running in a second container creates the second virtualized handle.

10. The method of claim 1, further comprising:
receiving a response to the I/O request that includes the handle; and
modifying the response to the I/O request by replacing the handle with the first virtualized handle or the second virtualized handle.

11. The method of claim 1, further comprising:
receiving I/O requests from the first application or the second application that target the peripheral; and
managing the I/O requests in accordance with policy.

12. The method of claim 11, wherein managing the I/O requests in accordance with policy comprises one or more of: arbitrating, prioritizing or enforcing a quality of service.

13. The method of claim 1, further comprising:
detecting that a third application has been loaded;
determining that the third application has a higher priority than the first application or the second application; and
preventing the first application or the second application from accessing the peripheral while allowing the third application to access the peripheral.

14. A method for managing peripherals in a containerized environment, the method comprising:
determining that a first application hosted in a first container should have access to a peripheral, the peripheral being associated with a handle by which the peripheral is accessed;
virtualizing the peripheral in the first container by creating a first virtualized handle, mapping the first virtualized handle to the handle, and providing the first virtualized handle to the first application to cause the first application to use the first virtualized handle rather than the handle to access the peripheral;
determining that a second application hosted in a second container should have access to the peripheral;
virtualizing the peripheral in the second container by creating a second virtualized handle, mapping the second virtualized handle to the handle, and providing the second virtualized handle to the second application to cause the second application to use the second virtualized handle rather than the handle to access the peripheral;
receiving I/O requests that target the peripheral that has been virtualized in the first and second containers;
determining that a first set of the I/O requests are from the first application by detecting that each I/O request in the first set of the I/O requests includes the first virtualized handle;
determining that a second set of the I/O requests are from the second application by detecting that each I/O request in the second set of the I/O requests includes the second virtualized handle; and
managing the I/O requests in accordance with policy, including applying the policy in a first manner to the first set of the I/O requests based on the first set of the I/O requests being from the first application, and applying the policy in a second manner, different from the first manner, to the second set of the I/O requests based on the second set of the I/O requests being from the second application.

15. The method of claim 14, wherein managing the I/O requests in accordance with policy comprises one or more of: arbitrating, prioritizing or enforcing a quality of service.

16. One or more computer storage media storing computer executable instructions which when executed implement a method for managing peripherals in a containerized environment, the method comprising:
detecting that a first application is attempting to open a peripheral by detecting that an operating system has responded to an I/O request of the first application by providing a handle to the peripheral;
preventing the first application from receiving the handle to the peripheral by providing a first virtualized handle rather than the handle to the first application;
mapping the first virtualized handle to the handle;
detecting that a second application is attempting to open the peripheral by detecting that the operating system has responded to an I/O request of the second application by providing the handle to the peripheral;
preventing the second application from receiving the handle to the peripheral by providing a second virtualized handle rather than the handle to the second application;
mapping the second virtualized handle to the handle;
receiving an I/O request that includes the first virtualized handle or the second virtualized handle; and
modifying the I/O request by replacing the first virtualized handle or the second virtualized handle with the handle.

17. The computer storage media of claim 16, wherein the first application is hosted in a first container and the second application is hosted in a second container.

18. The computer storage media of claim 17, wherein the first and second containers are software containers.

19. The computer storage media of claim 17, wherein the first and second containers are hardware containers.

20. The computer storage media of claim 17, wherein the first container is a software container and the second container is a hardware container.

\* \* \* \* \*